United States Patent [19]

Dickens

[11] Patent Number: 4,682,781
[45] Date of Patent: Jul. 28, 1987

[54] SLED SKIS

[76] Inventor: James Dickens, 28 Westland St., Hartford, Conn. 06120

[21] Appl. No.: 831,933

[22] Filed: Feb. 20, 1986

[51] Int. Cl.$^4$ ............................................. B62B 13/04
[52] U.S. Cl. ....................................... 280/22; 280/28
[58] Field of Search ................... 280/12 F, 22, 28, 18; 24/609, 628

[56] References Cited

U.S. PATENT DOCUMENTS

| | | | |
|---|---|---|---|
| 954,377 | 4/1910 | Bystrom | 280/28 |
| 1,303,388 | 5/1919 | Reach | 280/21 A |
| 1,995,681 | 3/1935 | Lamoy | 280/22 |
| 2,016,187 | 10/1935 | Vincent | 280/28 |
| 2,824,746 | 2/1958 | Schummer | 280/28 |
| 3,001,252 | 9/1961 | Erickson et al. | 24/609 X |
| 3,578,351 | 5/1971 | McAtee | 280/28 |
| 3,734,523 | 5/1973 | Field | 280/22 X |
| 3,738,676 | 6/1973 | Hand | 280/28 X |
| 3,751,057 | 8/1973 | Matthiessen | 280/28 |
| 3,856,318 | 12/1974 | Hollenbeck | 280/28 |
| 4,105,217 | 8/1978 | Metelow et al. | 280/28 |

*Primary Examiner*—John J. Love
*Assistant Examiner*—Michael Mar
*Attorney, Agent, or Firm*—Fishman & Dionne

[57] ABSTRACT

Each sled runner or rail from a conventional snow sled is provided with a pair of skis for attachment thereto. In particular, the section of the sled which bends or twists in response to the sled handle has a sled ski attached thereto which corresponds to the length of the bending section while the remaining length of sled rail has a second, separate sled ski attached thereto. As a result, when the handle is actuated in the desired direction, the metal sled rails will bend in that direction and the section of sled ski attached thereto will easily be directed in the direction of the bent sled rail. In this way, control and maneuverability of the sled is greatly increased relative to the numerous single piece sled ski attachments typically found in the prior art.

3 Claims, 2 Drawing Figures

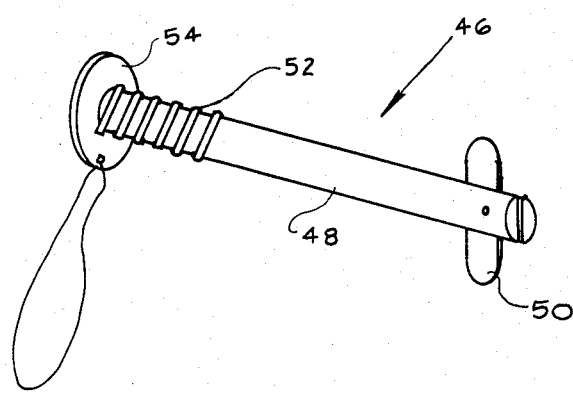

SLED SKIS

BACKGROUND OF THE INVENTION

This invention relates to a pair of detachable skis for use in conjunction with existing snow sleds and the like. More particularly, this invention relates to new and improved ski attachments for sleds which permit improved control and maneuverability relative to prior art ski attachments used on sleds.

Sleds are used by children and adults to slide down hills covered with snow as a winter time recreational activity. It is well known that such snow sleds comprise a platform for supporting one or more riders thereon which in turn, is attached to a pair of parallel, typically metal, sled runners. These sled runners are generally narrow and are comparable to rails. The sled of the type hereinabove described is directionally controlled by pivoting a wooden handle mounted on the platform and arranged perpendicularly to the sled runners. This handle acts to slightly bend or twist the metal sled runners to the right or to the left resulting in a corresponding directional change as the rider slides down the snowy hill.

A recognized problem and deficiency with sleds of the type described above exists when the hill has deep snow or snow of a fluffy nature. Under such snow conditions, the narrow sled runners or rails do not easily glide down the hill and therefore sledding is made difficult or impossible. It will be appreciated that the metal sled runners or rails are designed for use on hard packed snow conditions.

One way of overcoming the above discussed problem has been to attach a pair of relatively wider skis to the narrow parallel sled runners or rails. The wider skis will function in a manner substantially similar to downhill or cross country skis used by individual skiers and will thus permit the sled to be used in deep and/or fluffy snowy conditions. Examples of the use of ski attachments on snow sleds are disclosed in U.S. Pat. Nos. 954,377, 1,303,388, 2,016,187, 3,578,351, 3,738,676, 3,751,057, and 4,105,217.

While suitable for their intended purposes, all of the prior art attempts of providing sled skis to sleds suffer from an important problem and deficiency. This problem stems from the fact that typically, a single continuous ski is used in conjunction with each sled runner or rail. The use of a single and generally rigid ski will adversely effect the control and maneuverability of the sled when the handle is actuated by the sled rider. In practice, while the handle will easily bend the sled rail in the desired direction, it is much more difficult to bend the attached sled ski in a desired manner. As a consequence, control of the sled on downhill runs are quite difficult when using the several devices shown in the prior art patents.

SUMMARY OF THE INVENTION

The above-discussed and other problems in deficiency of the prior art are overcome or alleviated by the detachable sled skis for use with sleds of the present invention. In accordance with the present invention, each sled runner or rail is provided with a pair of skis for attachment thereto. In particular, the section of the sled which bends or twists in response to the sled handle has a sled ski attached thereto which corresponds to the length of the bending section while the remaining length of sled rail has a second, separate sled ski attached thereto. As a result, when the handle is actuated in the desired direction, the metal sled rails will bend in that direction and the section of sled ski attached thereto will easily be directed in the direction of the bent sled rail. In this way, control and maneuverability of the sled is greatly increased relative to the numerous sled ski attachments typically found in the prior art.

The above-described features and advantages of present invention will be apparent to and understood by those skilled in the art from the following detailed description and drawings.

BRIEF DESCRIPTION OF THE DRAWINGS

Referring now to the drawings, wherein like elements are numbered alike in the several Figures:

FIG. 2 is a perspective view of a connecting member which may be used to attach the sled skis of FIG. 1 to a conventional sled.

DESCRIPTION OF THE PREFERRED EMBODIMENT

Figure 1:
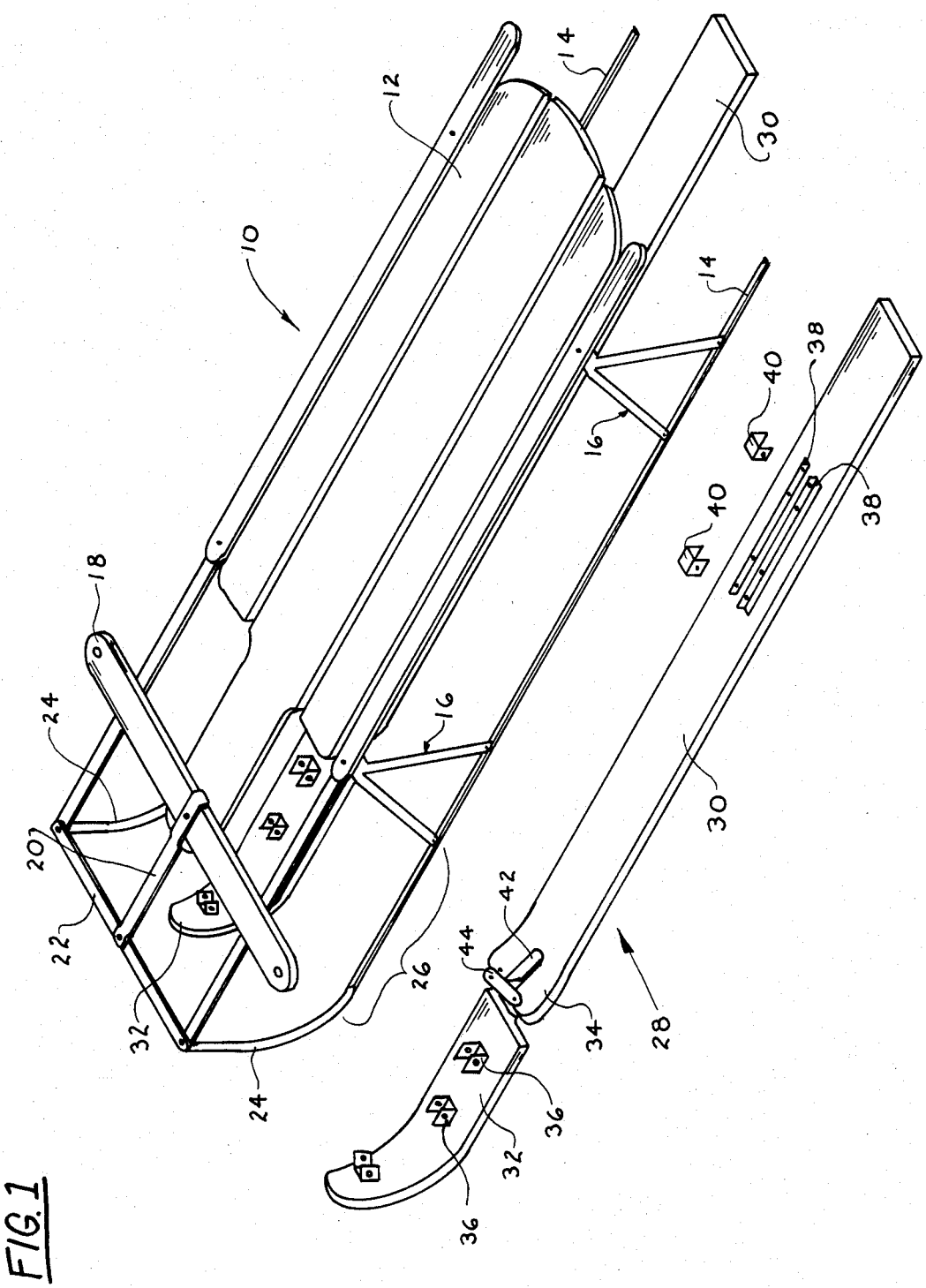
FIG. 1 is a perspective view of a conventional sled and the detachable sled skis used in conjunction therewith and in accordance with the present invention.

Referring first to FIG. 1, a conventional sled is shown generally at 10. Sled 10 includes a planer support portion 12 for supporting one or more riders or passengers during use. Support platform 12 is attached to a pair of parallel sled runners or rails 14 by four (4) or more metal interconnecting members shown generally at 16. A handle 18 is mounted on support platform 12 and is oriented transversely to rails 14 as shown in FIG. 1. Handle 18 connects to rails 14 via a connecting member 20 on a crossbar 22. During use, handle 18 is pivoted clockwise or counter clockwise which then actuates connecting member 20 and crossbar 22. As a result, each curved section 24 of sled rails 14 and at least a portion of the sled rails 14 identified at 26 will bend or twist either to the right or left depending upon which way the handle 18 is pivoted. This in turn, will cause sled 10 to travel towards the right or left as it slides down the side of a snowy hill.

As discussed hereinabove, one drawback to a sled as shown in FIG. 1 is that it is not well adapted for use in deep and/or fluffy snow. Instead, the sled will function best on a hard-packed snowy surface.

The present invention overcomes the above discussed problem by providing a pair of detachable sled skis identified generally at 28 to each sled rail 14. It is an important feature of snow skis 28 that they comprise two pieces including a longer piece 30 and a shorter piece 32. Shorter piece 32 curves upwardly at one end thereof and is adapted to correspond to the portion of sled rails 14 shown at 24 and 26. The longer length of sled ski 30 corresponds to and is attached to the remaining length of sled rail 14. Preferably, the end of ski portion 30 closest to ski portion 32 will include a slightly upwardly curved section 34.

Sled skis 28 may be attached to sled rails 14 in any suitable and well known manner. In the example shown in FIG. 1, "U" shaped brackets 36 are provided on ski portion 32. These "U" shaped brackets are sized to except ski rail 14 therebetween and are then held onto sled rail 14 by a nut and bolt, cotter pin or the specially designed pin shown in FIG. 2 and which will be discussed in greater detail herein after. Alternative methods of attaching skis 28 to sled rail 14 are shown in the longer ski portion 30. Thus, ski portion 30 includes a pair of "L" shaped members 38 which are spaced from one another so as to accept sled rail 14 therebetween. Next, "U" shaped brackets 40 are fitted over sled rail 14 so as to match up with corresponding openings in "L" shaped members 38 and "U" shaped brackets 40. Thereafter, nuts and bolts, cotter pins or the specially designed pins of FIG. 2 may be loaded through the openings for effecting a tight engagement therebetween. Finally, the section 34 of ski portion 30 includes a longitudinal slot 42 through the center thereof and extending from one end thereof. Slot 42 is again sized to permit entry of rail 14 therein. Because section 34 curves upwardly, slot 42 will be raised above rail 14 for engagement thereon so that pivoting retainer 44 can be slingably latched as shown in FIG. 1. Of course any other suitable method of attaching skis 28 to rails 14 may be utilized with the present invention.

Referring now to FIG. 2, in a preferred embodiment, the pins used in attaching the "U" shaped and other brackets to rails 14 is of the type identified generally at 46. Pin 46 includes a longitudinal section 48, a pivoting stop 50 and a spring 52. During use, pivoting stop 50 is pivoted in a position parallel to longitudinal section 48 whereupon it enters the openings in the "U" shaped or other brackets. Upon exiting the openings, pivoting piece 50 is pivoted perpendicular to longitudinal section 48 so as to retain pin 46 within the opening. In this way, spring 52 will be biased between the "U" shaped brackets and the head 54 of pin 46. This biased section will provide a strong and tight fit between sled skis 28 and rails 14.

The detachable sled skis for use in conjunction with a conventional sled of the present invention provides many features and advantages not found in the prior art. The chief feature and advantage of the present invention is that the sled skis used herein are comprised of two pieces, one of the pieces corresponding to that portion of sled rail 14 which bends in a desired direction when the handle bar of the sled is actuated. Thus, unlike prior art devices wherein the one piece snow ski attached to the sled rail is incapable of any appreciable bending during steering, the present invention will easily turn with rail 14 and provide improved control during steering.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. In a snow sled comprising a platform supported by two essentially parallel sled rails, a portion of each sled rail being actuated by a steering means and defining a bendable steering portion and a non-steering portion, the steering portion of each sled rail being upwardly curved at a forward end thereof, the improvement comprising:
a pair of sled skis adapted for attachment to the sled rails, said sled skis being wider than the sled rails;
wherein each of said sled skis includes two separate and unattachable pieces, a first piece having a curve corresponding to the bendable steering portion of each sled rail and being attachable to said sled rail steering portion, and a second piece corresponding to and being attachable to the non-steering portion of each sled rail;
wherein said second piece of said sled ski has an upwardly curved portion at a forward end thereof; and including
a recessed slot extending longitudinally through the central portion of said upwardly curved portion of said second piece said recessed slot adapted to receive said sled rail therein and means for releasably retaining said sled rail within said recessed slot.

2. The snow sled of claim 1 including means for attaching said sled skis to the sled rails comprising
brackets on said first and second pieces; and
bracket connecting means.

3. The snow sled of claim 2 wherein said bracket connecting means includes:
an elongated pin having a head at one end thereof and a pivoting stop at the other end thereof; and
a spring on said elongated pin and associated with said head.

* * * * *